(No Model.)
H. P. FELTROW.
CONDUIT ELECTRIC RAILWAY.
No. 493,695. Patented Mar. 21, 1893.
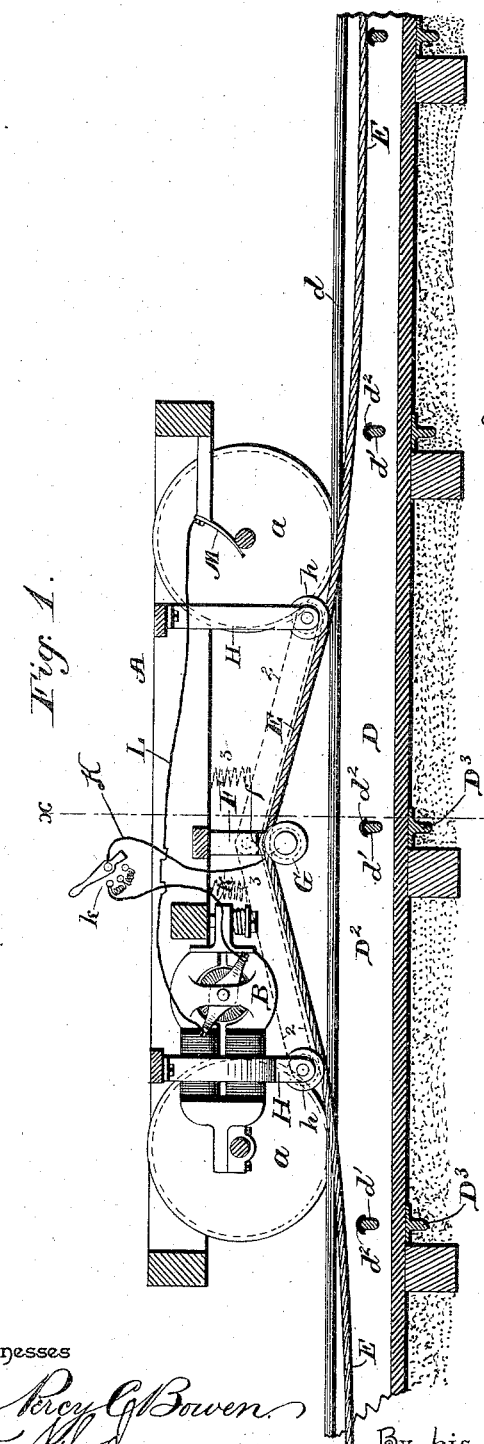
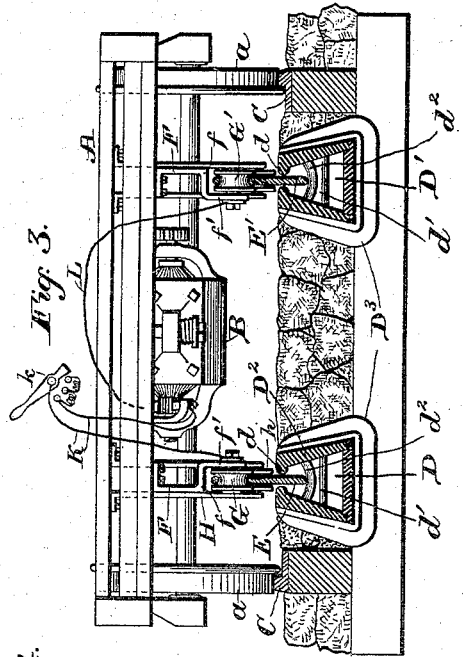
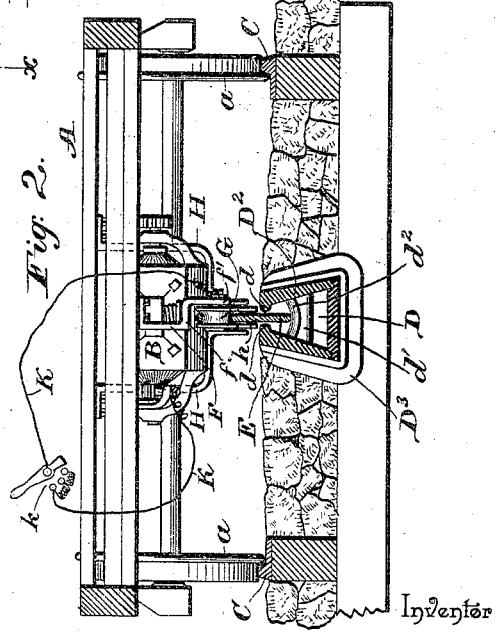
Witnesses
Percy C. Bowen
J. W. Jiggers
Inventor
Henry P. Feltrow,
By his Attorneys,
C. A. Snow & Co.

UNITED STATES PATENT OFFICE.

HENRY P. FELTROW, OF COLUMBUS, OHIO, ASSIGNOR OF ONE-HALF TO RICHMOND R. BROWN, OF SAME PLACE.

CONDUIT ELECTRIC RAILWAY.

SPECIFICATION forming part of Letters Patent No. 493,695, dated March 21, 1893.

Application filed March 4, 1891. Serial No. 383,732. (No model.)

*To all whom it may concern:*

Be it known that I, HENRY P. FELTROW, a citizen of the United States, residing at Columbus, in the county of Franklin and State of Ohio, have invented a new and useful Electric Railway, of which the following is a specification.

My invention relates to electric railways and more particularly to that class of railways in which the electricity is supplied to the motors upon the cars by means of a conductor laid in a conduit between the rails of the track.

My invention consists of the mechanism illustrated in the accompanying drawings, the peculiar construction, combination and arrangement of which will be fully described hereinafter and the specific points of novelty particularly pointed out in the claims.

In the drawings:—Figure 1 is a longitudinal sectional view of a railway system constructed in accordance with my invention. Fig. 2 is a transverse sectional view on the line $x$—$x$ of Fig. 1. Fig. 3 is a similar view of a modified form of the invention. Fig. 4 is a detail perspective view of the hook used for placing the conductor in position.

Similar letters and figures of reference designate corresponding parts in the several views of the drawings, referring to which A designates the truck of a car, mounted upon the wheels $a\ a$ and provided with a motor B of any suitable construction.

Between the track rails C is formed a conduit D the bottom of which is formed of any suitable material such as cement or vitrified material. The sides $D^2$ of the said conduit are formed of vitrified material, or other hard insulating material and terminate at their upper edges in integral inturned slot rails $d$, and the said sides are so placed as to be far enough apart at their lower edges to make plenty of room in the conduit for the conductor E, and the slot rails $d$, at their upper edges are brought near enough together to just leave sufficient room for the said conductor to pass freely between them. The sides of the conduit may be embedded in the cement or otherwise secured to the bottom and they are suitably braced by cross pieces $d'$ which extend from side to side of the conduit at intervals throughout its length, the upper edges of the said cross pieces $d'$ are of insulating material $d^2$ and serve also as supports for the conductor E. If found necessary braces $D^3$ of iron or other suitable material may be placed around the conduit at intervals to strengthen it. The conductor E is uninsulated except by the conduit (which is of insulating material) and may be formed of strands of wire in the form of a wire rope, to insure flexibility.

Depending from the truck A at the center thereof is a bracket F which extends downwardly for a short distance and is bent at right angles to form a shoulder $f$, and then again bent downwardly as at $f'$. A grooved trolley wheel G is journaled upon a stud projecting from the part $f'$ of the bracket F, just below the shoulder $f$.

Near each end of the truck, and in longitudinal line with the trolley wheel G are journaled in suitable brackets H, grooved wheels or rollers $h$ which extend down very near the slot rails $d$.

The operation of my invention is as follows:—When the car leaves the power house the conductor E is raised through the slot (which latter may be widened at this point to permit of the conductor being easily raised) by means of a hook I having a handle $i$ of insulating material (shown in Fig. 4) and the said conductor is placed over the trolley wheel G, beneath the shoulder $f$ of the bracket F which latter will in a great measure prevent the conductor from being thrown out of the trolley wheel. By inspection of Fig. 1 it will be seen that when the conductor E, is in operative position it passes over the trolley wheel G and under the two wheels $h\ h$ and the latter wheels prevent the conductor from being raised above the slot rails beyond the ends of the car. As the car passes along the conductor E passing over the trolley wheel G will be raised from the conduit through the slot immediately beneath the car, but will be held down near the slot rails at each end of the truck by the wheels $h, h$, the weight of the conductor will cause it to return below the slot rails after the car has passed and rest upon the insulated cross-pieces $d'$. The trolley wheel G receives the electric current from the conductor E and the said current is conveyed by the wire K which is provided with a suitable regulating device $k$ to the motor B. The return circuit may be through the rails as shown in Fig. 1 in which case a wire L, and brush M convey the current from the motor to the wheels $a\ a$ where it passes to the rails.

In the modification shown in Fig. 3 the track is provided with two conduits D and D' in each of which is placed a conductor E, E' one of which is used for the return circuit instead of the rail. In this case the car is provided with two trolley wheels G and G' and two sets of the wheels $h$, $h$, the trolley wheel G' being connected with the motor by a wire L' to conduit the return current to the return conductor E'.

It will be understood that I do not wish to limit myself to the precise details of construction as herein set forth as many modifications may be made therein, without departing from the spirit of the invention, as for instance in lieu of mounting the depressing wheels upon brackets I may mount them upon the ends of suitably arranged equalizing bars 2, 2 as shown in dotted lines in Fig. 1, the said bars 2 being held in proper position by springs 3, 3.

Having thus described my invention, what I claim, and desire to secure by Letters Patent, is—

1. In an electric railway, the combination of a conduit formed of insulating material and the opposite sides of which terminate at their upper ends in integral inturned slot rails, $d$, metallic braces exteriorly embracing the conduit at intervals, transverse insulated supports arranged inside of the conduit, the motor car having a centrally suspended trolley wheel electrically connected with the car motor, and a flexible conductor supported inside of said conduit on the insulated supports therein and adapted to be lifted out of the conduit between the integral slot rails and to be supported on the centrally suspended trolley wheel, substantially as described.

2. In an electric railway, the combination, of a conduit arranged between the track rails and having its sides and bottom formed of insulating material, cross-pieces arranged transversely in the conduit and having upper insulated faces, the motor car, a central trolley wheel suspended beneath the car and in circuit with its motor, opposite depressing wheels suspended beneath the car near each end and in close proximity to the conduit, and a flexible conductor resting on the insulated cross-pieces in the conduit and adapted to be lifted out of the conduit onto the trolley wheel and to bear under said opposite depressing wheels, substantially as set forth.

3. In an electric railway, a car having a motor, a bracket F depending from the center of the car, a shoulder $f$, upon the bracket F, a trolley wheel G journaled upon the said bracket and electrically connected with the motor, brackets H depending from the car near the ends thereof depressing wheels $h$ journaled in the lower ends of the brackets H, in combination with a flexible conductor arranged in a conduit of insulating material beneath the track and connected with a suitable source of electricity and adapted to be raised out of the conduit by the trolley wheel G, through which electrical contact is made to the motor and be depressed by the depressing wheels $h$, $h$, and a suitable return circuit, substantially as and for the purpose specified.

In testimony that I claim the foregoing as my own I have hereto affixed my signature in presence of two witnesses.

HENRY P. FELTROW.

Witnesses:
R. D. ROBINSON,
CHAS. E. BEDWELL.